(12) United States Patent
Zhang et al.

(10) Patent No.: US 11,887,068 B2
(45) Date of Patent: Jan. 30, 2024

(54) TRANSACTION SETTLEMENT METHOD AND APPARATUS

(71) Applicant: CHINA UNIONPAY CO., LTD., Shanghai (CN)

(72) Inventors: Xiaoming Zhang, Shanghai (CN); Lin Chen, Shanghai (CN); Fei Zhang, Shanghai (CN); Sen Yang, Shanghai (CN); Haiyang Zhang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 420 days.

(21) Appl. No.: 17/279,027

(22) PCT Filed: Nov. 12, 2019

(86) PCT No.: PCT/CN2019/117657
§ 371 (c)(1),
(2) Date: Mar. 23, 2021

(87) PCT Pub. No.: WO2020/103728
PCT Pub. Date: May 28, 2020

(65) Prior Publication Data
US 2022/0044211 A1 Feb. 10, 2022

(30) Foreign Application Priority Data
Nov. 19, 2018 (CN) .......................... 201811376395.X (51) Int. Cl.
*G06Q 20/02* (2012.01)
*G06Q 40/02* (2023.01)
*G06F 9/54* (2006.01)

(52) U.S. Cl.
CPC ........... *G06Q 20/023* (2013.01); *G06F 9/546* (2013.01); *G06Q 40/02* (2013.01)

(58) Field of Classification Search
CPC .... G06Q 20/023; G06Q 40/02; G06Q 20/209; G06Q 20/389; G06Q 40/04; G06F 9/546; G07F 7/0873
See application file for complete search history.

(56) References Cited

U.S. PATENT DOCUMENTS

2014/0298027 A1* 10/2014 Roberts ................. G06Q 20/20
713/171

FOREIGN PATENT DOCUMENTS

| CN | 101616129 A | 12/2009 |
|----|-------------|---------|
| CN | 101901193 A | 12/2010 |

(Continued)

OTHER PUBLICATIONS

The World Intellectual Property Organization (WIPO) International Search Report for PCT/CN2019/117657 dated Feb. 18, 2020 6 Pages (including translation).

*Primary Examiner* — Albert M Phillips, III
(74) *Attorney, Agent, or Firm* — ANOVA LAW GROUP, PLLC (57) ABSTRACT

The present disclosure provides a method and a device for transaction clearing. The method includes receiving first clearing requests transmitted by a quantity N of terminals, where N>1; according to the first clearing requests, acquiring transaction data of the quantity N of terminals from a database; initializing a cache queue, and loading the transaction data into the cache queue; reading the transaction data in the cache queue, and performing a clearing process on the transaction data; and writing a clearing result into the database and feeding back the terminals with an execution result of the first clearing requests.

9 Claims, 5 Drawing Sheets

(56) References Cited

FOREIGN PATENT DOCUMENTS

| | | |
|---|---|---|
| CN | 101957974 A | 1/2011 |
| CN | 102035879 A | 4/2011 |
| CN | 105302907 A | 2/2016 |
| CN | 105630924 A | 6/2016 |
| CN | 106504348 A | 3/2017 |
| CN | 107679931 A | 2/2018 |
| CN | 108595276 A | 9/2018 |
| CN | 108647104 A | 10/2018 |
| CN | 109492016 A | 3/2019 |
| WO | 2017205086 A1 | 11/2017 |

\* cited by examiner

TRANSACTION SETTLEMENT METHOD AND APPARATUS

CROSS-REFERENCE TO RELATED APPLICATIONS

This application is a national phase entry under 35 U.S.C § 371 of International Application No. PCT/CN2019/117657, filed on Nov. 12, 2019, which claims priority of Chinese Patent Application No. 201811376395.X, entitled "Method and Device for Transaction Clearing", filed with the State Intellectual Property Office of P. R. China on Nov. 19, 2018, the entire content of all of which is incorporated herein by reference.

FIELD OF THE DISCLOSURE

The present disclosure generally relates to the technical field of data processing and, more particularly, relates to a method and a device for transaction clearing.

BACKGROUND

Clearing may include two clearing types, such as interbank clearing and acquiring clearing. The interbank clearing may refer to the clearing with respect to an acquirer and a card issuer. The acquiring clearing may refer to the clearing with respect to merchants and acquiring professional service institutions for the acquirers. Bank card acquiring service may refer to the domestic and foreign currency fund settlement services provided by issuing banks to merchants. That is, finally, cardholders may swipe their cards at merchants contracted with the issuing banks, and funds may be settled by the issuing banks. The settlement process of an acquiring bank is to obtain transaction receipts and transaction data from the merchants, then send the payments to the merchants after deducting the fees which are calculated according to a rate, and deduct a certain percentage of processing fees.

In the payment field, thousands or even more terminals may be connected to the platform servers of merchant acquirers. Normally, the batch clearing of the existing acquiring applications may be scheduled daily, and the clearing batch processing may be performed on all terminals during the clearing process. Such clearing manner may not be sufficiently flexible. If there is an excessive quantity of service backlogs on a certain day, it may cause enormous pressure on the server load.

BRIEF SUMMARY OF THE DISCLOSURE

The present disclosure provides a method and a device for transaction clearing, thereby increasing clearing flexibility and reducing the server load pressure.

Various embodiments of the present disclosure provide the method for transaction clearing, including:
receiving first clearing requests transmitted by a quantity N of terminals, where N>1;
according to the first clearing requests, acquiring transaction data of the quantity N of terminals from a database;
initializing a cache queue, and loading the transaction data into the cache queue;
reading the transaction data in the cache queue, and performing a clearing process on the transaction data; and
writing a clearing result into the database and feeding back the terminals with an execution result of the first clearing requests.

Optionally, the cache queue is a circular queue, and initializing the cache queue includes:
according to the quantity N of terminals, determining a quantity of cache lines of the circular queue, where the quantity of cache lines of the circular queue is 2 to a power of M, where $2^M > N$.

Optionally, loading the transaction data into the cache queue includes:
allocating sequence numbers to the transaction data, where a sequence number is allocated to transaction data of a same terminal; and
for transaction data of any terminal, using a sequence number of the transaction data to perform a modulo operation on the quantity of cache lines of the circular queue, determining a cache line in the circular queue corresponding to the transaction data, and loading the transaction data of the terminal into the corresponding cache line.

Optionally, initializing the cache queue further includes:
according to the quantity of terminals, establishing multiple threads; and
reading the transaction data in the cache queue includes:
parallel-reading the transaction data in the cache queue by the multiple threads.

Optionally, prior to initializing the cache queue and loading the transaction data into the cache queue, the method further includes:
acquiring second clearing requests, where the second clearing requests are launched internally after a preset time is detected; and
according to the second clearing requests, acquiring transaction data, from a history time before the preset time to within the preset time, from the database.

Various embodiments of the present disclosure provide the device for transaction clearing, including:
a receiving unit, configured to receive first clearing requests transmitted by a quantity N of terminals, where N>1;
an acquiring unit, configured to, according to the first clearing requests, acquire transaction data of the quantity N of terminals from a database;
a write unit, configured to initialize a cache queue and load the transaction data into the cache queue;
a read unit, configured to read the transaction data in the cache queue and perform a clearing process on the transaction data; and
a storage unit, configured to write a clearing result into the database and feed back the terminals with an execution result of the first clearing requests.

Optionally, the cache queue is a circular queue, and the write unit is specifically configured to:
according to the quantity N of terminals, determine a quantity of cache lines of the circular queue, where the quantity of cache lines of the circular queue is 2 to a power of M, where $2^M > N$.

Optionally, the write unit is specifically configured to:
allocate sequence numbers to the transaction data, where a sequence number is allocated to transaction data of a same terminal; and
for transaction data of any terminal, use a sequence number of the transaction data to perform a modulo operation on the quantity of cache lines of the circular queue, determine a cache line in the circular queue corresponding to the transaction data, and load the transaction data of the terminal into the corresponding cache line.

Optionally, the write unit is further configured to, according to the quantity of terminals, establish multiple threads; and the read unit is specifically configured to parallel-read the transaction data in the cache queue by the multiple threads.

Optionally, the receiving unit is further configured to acquire second clearing requests, where the second clearing requests are launched internally after a preset time is detected; and the acquiring unit is further configured to, according to the second clearing requests, acquire transaction data, from a history time before the preset time to within the preset time, from the database.

Various embodiments of the present disclosure further provide an electronic device, including:

at least one processor; and a memory communicatively connected to the at least one processor; where:

the memory stores instructions which are executed by the at least one processor; and the instructions are executed by the at least one processor to execute the above-mentioned method.

Various embodiments of the present disclosure further provide a non-transitory computer-readable storage medium, where the non-transitory computer-readable storage medium stores computer instructions, and the computer instructions are configured to cause a computer execute the above-mentioned method.

Various embodiments of the present disclosure may support the terminals to actively trigger the clearing. The server may receive the first clearing requests transmitted by the terminals, which may include the first clearing request transmitted by one terminal and also include the first clearing requests transmitted by a plurality of terminals simultaneously. The server may acquire the transaction data of a corresponding terminal from the database according to the first clearing request. The cache queue may be initialized, and transaction data may be loaded into the cache queue. The transaction data in the cache queue may be read, the clearing processing may be performed on the transaction data, the clearing result may be written into the database, and the execution result of the first clearing request may be fed back to the terminal. In such way, for a single terminal, the clearing request may be initiated at any time, and a plurality of clearing requests may be initiated within a day, which may meet the real-time clearing needs of the terminal and increase the clearing flexibility. On the other hand, for the clearing processing server, there is no need to process clearing tasks of all terminals simultaneously, which may reduce server load pressure.

BRIEF DESCRIPTION OF THE DRAWINGS

In order to clearly illustrate the technical solutions in various embodiments of the present disclosure, the accompanying drawings, which are required to be used in the description of disclosed embodiments, are briefly described hereinafter. Obviously, the accompanying drawings in the following description are merely certain embodiments of the present disclosure. Other accompanying drawings derived from such accompanying drawings may be acquired by those skilled in the art without creative work.

DETAILED DESCRIPTION

The technical solutions in various embodiments of the present disclosure are described clearly and completely in conjunction with the drawings in various embodiments of the present disclosure. Obviously, the described embodiments are merely a part of various embodiments of the present disclosure, but not all of various embodiments. Based on various embodiments of the present disclosure, all other embodiments obtained by those skilled in the art without creative work fall within the protection scope of the present disclosure.

Figure 1:
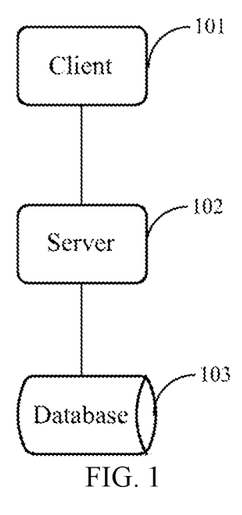
FIG. 1 illustrates a schematic of a system architecture in various embodiments of the present disclosure.

A system architecture in various embodiments of the present disclosure, shown in FIG. 1, may include a client 101, a server 102, and a database 103, where the client 101 may be an application (abbreviated as APP), and a user may log in the client with the user's account information, initiate a clearing request through the client, and accept a clearing result. The server 102 may be a server in a platform system of an acquirer, which is used to receive the clearing request transmitted by the client, perform clearing processing, and send a clearing feedback to the client. The server 102 may also automatically initiate clearing tasks internally. The database 103 may store all transaction data, and the server 102 may read the transaction data from the database 103 and perform clearing processing based on the transaction data.

The client 101 may be installed on a terminal. The terminal may a dedicated payment device such as POS (point of sale), a mobile electronic device with transaction payment functions such as a mobile phone, a tablet computer, or a dedicated handheld device, or a device connected by wired access manner with payment functions such as a personal computer (abbreviated as PC), a notebook computer, a server and the like. The server 102 may be a network device, such as a computer and the like. The server 102 may be an independent device or a server cluster formed by multiple servers. Optionally, the server 102 may use cloud computing technology for information processing.

The client 101 may communicate with the server 102 through the INTERNET network and communicate with the server 102 through a mobile communication system such as global system for mobile communications (abbreviated as GSM), long-term evolution (abbreviated as LTE) system, or the like.

Figure 2:
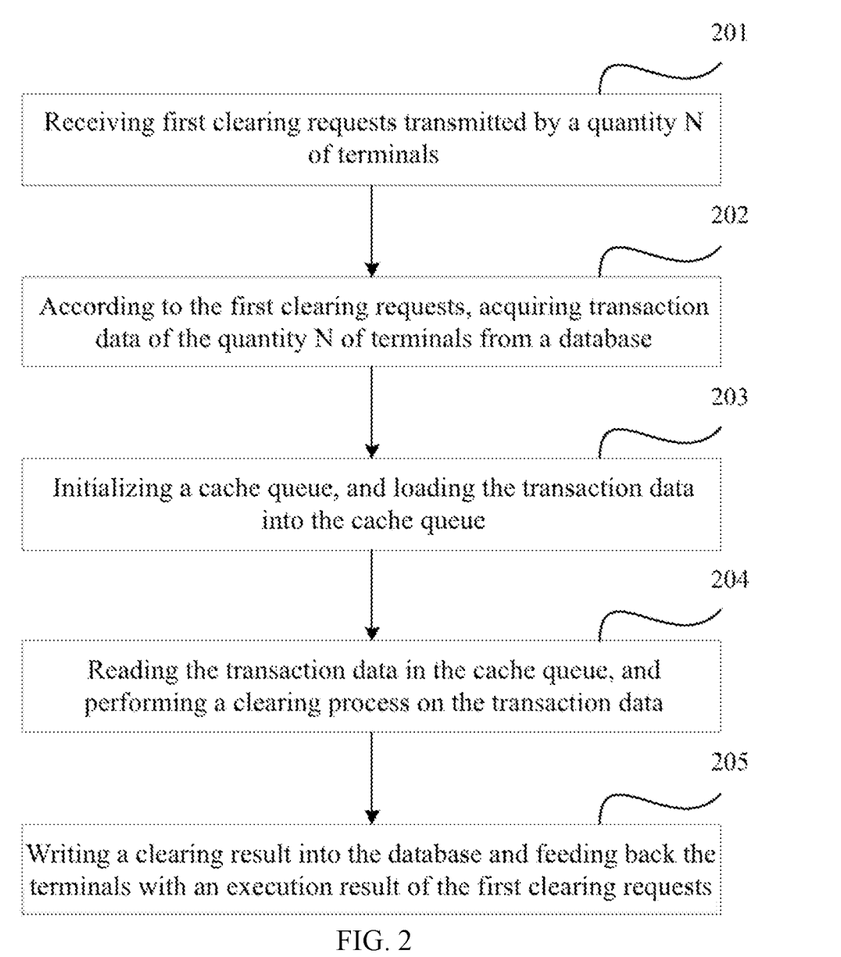
FIG. 2 illustrates a schematic flowchart of a transaction clearing method in various embodiments of the present disclosure.

Various embodiments of the present disclosure provide a transaction clearing method. As shown in FIG. 2, the transaction clearing method may include the following steps:

step 201, receiving first clearing requests transmitted by a quantity N of terminals, where N>1;

step 202, according to the first clearing requests, acquiring transaction data of the quantity N of terminals from a database;

step 203, initializing a cache queue, and loading the transaction data into the cache queue;

step 204, reading the transaction data in the cache queue, and performing a clearing process on the transaction data; and step 205, writing a clearing result into the database and feeding back the terminals with an execution result of the first clearing requests.

Various embodiments of the present disclosure may support the terminals to actively trigger the clearing. The server may receive the first clearing requests transmitted by the terminals, which may be the first clearing request transmitted by one terminal and also be the first clearing requests transmitted by a plurality of terminals simultaneously. The server may acquire the transaction data of a corresponding terminal from the database according to the first clearing request. The cache queue may be initialized, and transaction data may be loaded into the cache queue. The transaction data in the cache queue may be read, the clearing processing may be performed on the transaction data, the clearing result may be written into the database, and the execution result of the first clearing request may be fed back to the terminal. In such way, for a single terminal, the clearing request may be initiated at any time, and a plurality of clearing requests may be initiated within a day, which may meet the real-time clearing needs of the terminal and increase the clearing flexibility. On the other hand, for the clearing processing server, there is no need to process clearing tasks of all terminals simultaneously, which may reduce server load pressure.

The cache queue in various embodiments of the present disclosure may be a ordinary linear queue, a circular queue, or a circular-like queue. Optionally, the circular queue may be used in various embodiments of the present disclosure.

In the above-mentioned step 203, initializing the cache queue may include:

according to the quantity N of terminals, determining a quantity of cache lines of the circular queue, where the quantity of cache lines of the circular queue is 2 to a power of M, where 2M>N.

For an ordinary linear queue, there may be two pointers generally, one may point to the head of the queue and one may point to the end of the queue. The pointer needs to be updated when the elements of the queue are produced or consumed. There are not only read operations but also write operations; meanwhile, the ordinary linear queue may also need to save a variable for the queue size in order to distinguish whether the queue is empty or full. Such three variables may often in a cache line, and there may always be extensive competition between the head pointer, the tail pointer, and the size variable. Meanwhile, for the ordinary linear queue, the computer may start processing the data in the queue from the head of the queue; after the data in a previous cache line is processed, the data in a latter cache line may be moved to the previous cache line to continue processing, which may have an excessively low efficiency. Or, the computer may start processing from the head of the queue; after the data in a previous cache line is processed, the computer may move to a next cache line to continue processing. In such way, the previous cache line may be in an idle status, and the queue capacity may be limited, which may cause queue space waste.

The circular queue adopted in various embodiments of the present disclosure may solve such problems. The circular queue does not need the tail pointer, which may solve the competition operation of the queue head, the queue tail, and the queue size of the ordinary linear queue. In the circular queue, only one producer may write data to the cache line, and each consumer may only need to read the elements in the cache line in the ring, which may not have such competition operation. Meanwhile, the quantity of cache lines in the ring queue may be configured according to the quantity of terminals, which ensures that the data of all terminals may be written into the ring.

In various embodiments of the present disclosure, through modulo operation, the serial number of the cache line in the circular queue which the terminal data is written into may be quickly located. Since the quantity of cache lines in the circular queue is 2 to the power of M, the modulo operation may be converted to bit operation to improve efficiency, which is more beneficial for the calculations based on binary computers.

Specifically, in step 203, loading the transaction data into the cache queue may include:

allocating sequence numbers to the transaction data, where a sequence number is allocated to transaction data of a same terminal; and for transaction data of any terminal, using a sequence number of the transaction data to perform a modulo operation on the quantity of cache lines of the circular queue, determining a cache line in the circular queue corresponding to the transaction data, and loading the transaction data of the terminal into the corresponding cache line.

Figure 3:
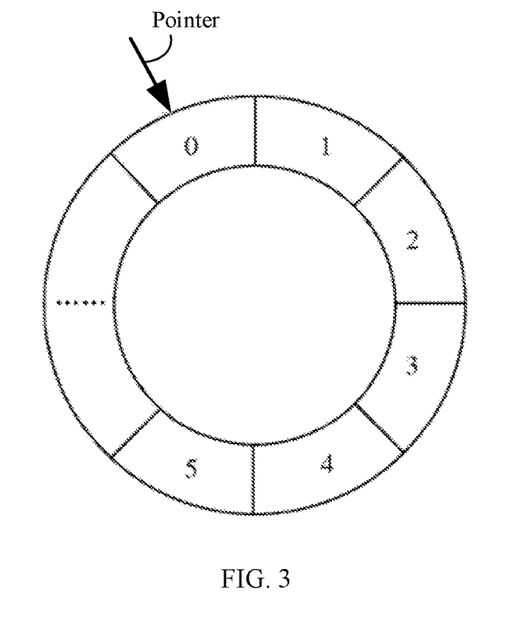
FIG. 3 illustrates a structural schematic of a circular queue in various embodiments of the present disclosure.

In a specific implementation process, the circular queue may be shown in FIG. 3. The cache lines in the circular queue may be connected end to end, the quantity of cache lines in the queue may have been configured, each cache line may have a subscript, and the subscripts of the cache lines may increase sequentially. The server may assign a sequence number to transaction data to-be-processed, and the transaction data of a same terminal may be assigned with a sequence number. Meanwhile, there is a pointer which may assign the sequence numbers to the terminals and point to a next available cache line in the ring, and the server may write a next transaction data to-be-processed into the cache line pointed to by the pointer. As the server keeps filling the ring, the sequence numbers may keep increasing till the ring is completely filled. To locate the cache line pointed to by the pointer, the modulo operation may be used for quickly locating the cache line, that is, the sequence number of the current transaction data may be used to perform the modulo operation on the quantity of all cache lines. Since the size of the ring is 2 to the power of M, it is more beneficial for the calculations based on binary computers.

In order to accelerate the data processing, in various embodiments of the present disclosure, multiple threads may be used to process the transaction data in the circular queue in parallel. In step 203, initializing the cache queue may further include:

according to the quantity of terminals, establishing multiple threads.

In step 204, reading the transaction data in the cache queue may include:

parallel-reading the transaction data in the cache queue by the multiple threads.

Furthermore, if certain terminals do not trigger clearing requests within a preset time, in order to avoid missing clearing, automatic clearing may be scheduled regularly in various embodiments of the present disclosure. Prior to initializing the cache queue and loading the transaction data into the cache queue, the method may further include:

acquiring second clearing requests, where the second clearing requests are launched internally after a preset time is detected; and according to the second clearing requests, acquiring transaction data, from a history time before the preset time to within the preset time, from the database.

In a specific implementation process, the transaction data in the database may be configured to be automatically and regularly cleared on a daily basis. The timing module inside the server may start the timing service regularly on a daily basis, and initiate a timing clearing task request. For example, the timing module may start the timing service at 22:00 every day and initiate the timing clearing task request to clear uncleared transaction data in the database between 22:00 of a previous day and 22:00 of a current day.

Moreover, various embodiments of the present disclosure may also adopt quantitative activation, that is, when the transaction data of a certain quantity of terminals is stored in the database each time, the clearing request may be initiated. For example, if the transaction data of 1000 terminals is stored in the database, the quantitative module inside the server may be triggered to initiate a quantitative clearing task request.

In such way, the terminal random trigger clearing and the server's internal regularly-scheduled and quantitative clearing may exist simultaneously, which may increase the flexibility of transaction clearing.

In order to understand the present disclosure more clearly, the above-mentioned process may be described in detail with below specific embodiments. The specific scenario in the exemplary embodiment one is that the terminal triggers the clearing task. The specific steps, shown in FIG. 4, may include the following steps.

Figure 4:
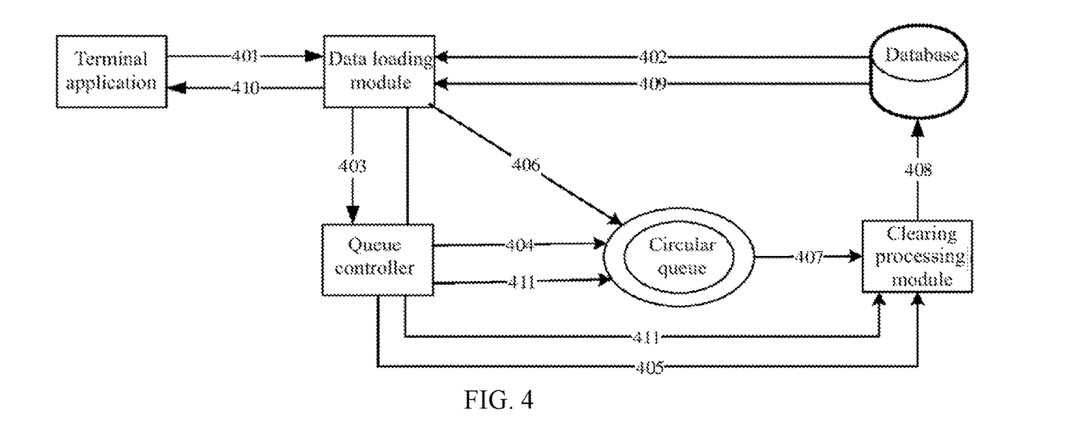
FIG. 4 illustrates a schematic flowchart of a transaction clearing method in the exemplary embodiment one of the present disclosure.

In step 401, a user may use the client on the terminal, such as a cashier clicks an instant clearing trigger button of the POS APP, to send an instant clearing request to the server through a HTTPS POST manner. The server may provide a random and instant clearing processing service interface to an external terminal for an external client to call.

In step 402, after receiving the clearing task, a data loading module may collect a clearing summary, read terminal transaction data from the database according to the request summary, and verify whether the terminal meets a clearing condition, such as whether the terminal is normal, and whether the terminal has unfinished transactions.

In step 403, the data loading module may start a queue controller.

In step 404, the queue controller may initialize the circular queue, and register the data loading module to the circular queue as a producer of the circular queue. The initialization task may include configuring the quantity of cache lines in the circular queue as the M power of 2; and establish a circular queue of a generic data type, which is a transferred event type where inputted data is event type data, for storing/transferring objects of clearing tasks (including attributes such as a merchant number, a terminal number, a clearing date, a clearing status, a batch number, a total amount, a total number of transactions, a transaction amount, a number of transactions, a return amount, a number of returns, and the like). Meanwhile, five parameters of the circular queue may be configured simultaneously.

The first parameter may be the factory class which generates events, where the events encapsulate generation-transaction data, that is, the clearing event object.

The second parameter may be the quantity of cache lines in the circular queue.

The third parameter may be a thread pool, including multiple threads (consumers), where one thread is configured to read and process transaction data in one cache line of the circular queue.

The fourth parameter may be the quantity of producers (data loading modules), where a single producer is used.

The fifth parameter may be the consumer waiting strategy, that is, after repeated unsuccessful attempts, exiting CPU and waiting for the next scheduling.

In step 405, the queue controller may start a clearing processing module, that is, establish a thread (consumer). One or more clearing processing modules may be established according to the clearing parameter, and one clearing processing module may perform clearing processing on the transaction data of one terminal. If there is only one terminal requesting clearing immediately, one clearing processing module may be established.

In step 406, the data loading module may write the transaction data to-be-cleared into the circular queue.

In step 407, the clearing processing module may read the transaction data to-be-cleared in the circular queue and start the clearing logic processing. Herein, multiple consumers, that is, multiple clearing processing modules, may process the transaction data in parallel.

In step 408, after the clearing processing module completes the clearing processing, the clearing results may be written into the database.

In step 409, after the database update is completed, the execution results may be summarized and fed back to the data loading module.

In step 410, the data loading module may notify the terminal application that the clearing is completed and may feed back the clearing results. Meanwhile, the data loading module may transmit a clearing completion notification to the queue controller.

In step 411, the queue controller may close the circular queue according to the clearing completion notification and close the clearing processing module.

The specific scenario in the exemplary embodiment two is that the clearing is regularly-scheduled by the server. The timing service module may be started regularly and initiate a timing clearing task request. The specific steps, shown in FIG. 5, may include the following steps.

Figure 5:
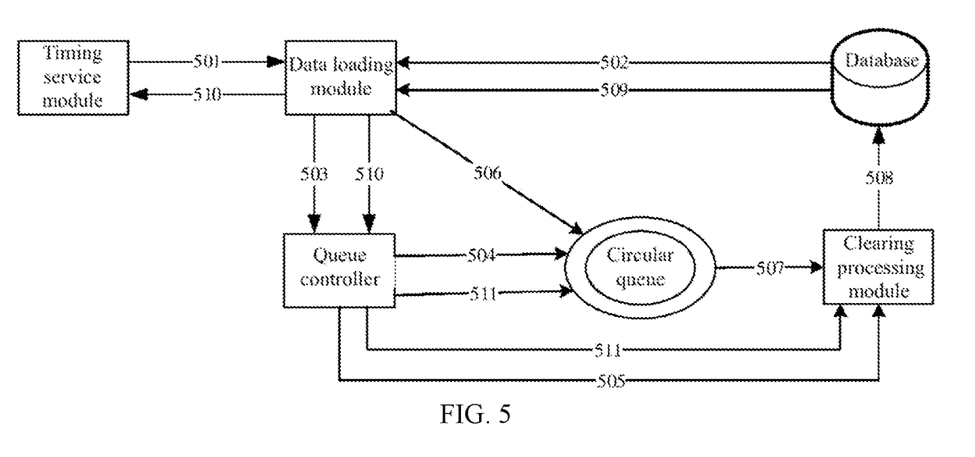
FIG. 5 illustrates a schematic flowchart of a transaction clearing method in the exemplary embodiment two of the present disclosure.

In step 501, the timing service module may detect a preset time and initiate a timing clearing request for inter-process call to the data loading module. The server may provide batch timing service interfaces for clearing processing to an internal module for the timing service module to call.

Steps 502 to 509 may be same as steps 402 to 409, which may not be repeated herein.

In step 510, the data loading module may notify the timing service module of the clearing completion. Meantime, the data loading module may transmit a clearing completion notification to the queue controller.

In step 511, the queue controller may close the circular queue according to the clearing completion notification and close the clearing processing module.

Figure 6:
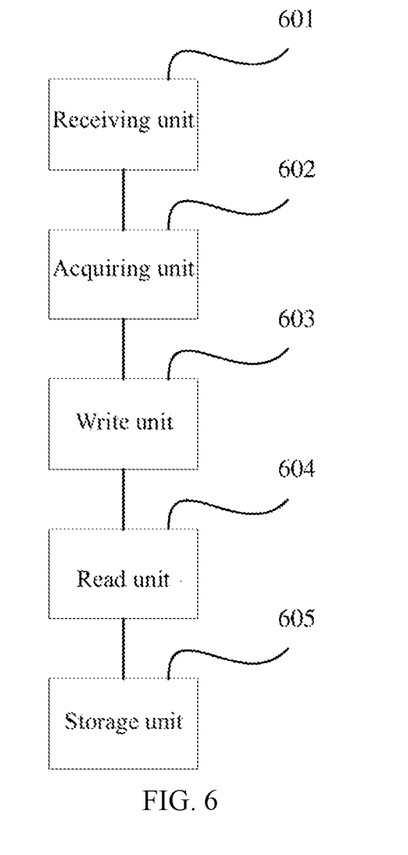
FIG. 6 illustrates a structural schematic of a transaction clearing device in various embodiments of the present disclosure.

Various embodiments of the present disclosure also provide a transaction clearing device, as shown in FIG. 6, including:

a receiving unit 601, configured to receive first clearing requests transmitted by a quantity N of terminals, where N>1;

an acquiring unit 602, configured to, according to the first clearing requests, acquire transaction data of the quantity N of terminals from a database;

a write unit 603, configured to initialize a cache queue and load the transaction data into the cache queue;

a read unit 604, configured to read the transaction data in the cache queue and perform a clearing process on the transaction data; and a storage unit 605, configured to write a clearing result into the database and feed back the terminals with an execution result of the first clearing requests.

Furthermore, the cache queue is a circular queue, and the write unit 603 may be specifically configured to:

according to the quantity N of terminals, determine a quantity of cache lines of the circular queue, where the quantity of cache lines of the circular queue is 2 to a power of M, where 2M>N.

Furthermore, the write unit 603 may be specifically configured to:

allocate sequence numbers to the transaction data, where a sequence number is allocated to transaction data of a same terminal; and for transaction data of any terminal, use a sequence number of the transaction data to perform a modulo operation on the quantity of cache lines of the circular queue, determine a cache line in the circular queue corresponding to the transaction data, and load the transaction data of the terminal into the corresponding cache line.

Furthermore, the write unit 603 may be further configured to, according to the quantity of terminals, establish multiple threads; and the read unit 604 may be configured to parallel-read the transaction data in the cache queue by the multiple threads.

Furthermore, the receiving unit 601 may be further configured to acquire second clearing requests, where the second clearing requests are launched internally after a preset time is detected; and the acquiring unit 602 may be further configured to, according to the second clearing requests, acquire transaction data, from a history time before the preset time to within the preset time, from the database.

Figure 7:
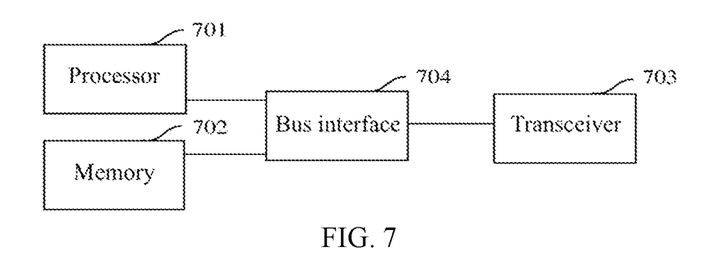
FIG. 7 illustrates a structural schematic of an electronic device in various embodiments of the present disclosure.

Based on the same principle, the present disclosure also provides an electronic device, as shown in FIG. 7, including:

a processor 701, a memory 702, a transceiver 703, and a bus interface 704, where the processor 701, the memory 702 and the transceiver 703 may be connected through the bus interface 704.

The processor 701 may be configured to read programs in the memory 702 and execute the following method:

receiving first clearing requests transmitted by a quantity N of terminals, where N>1;

according to the first clearing requests, acquiring transaction data of the quantity N of terminals from a database;

initializing a cache queue, and loading the transaction data into the cache queue;

reading the transaction data in the cache queue, and performing a clearing process on the transaction data; and writing a clearing result into the database and feeding back the terminals with an execution result of the first clearing requests.

Furthermore, the cache queue may be a circular queue, and the processor 701 may be specifically configured to:

according to the quantity N of terminals, determine a quantity of cache lines of the circular queue, where the quantity of cache lines of the circular queue is 2 to a power of M, where 2M>N.

Furthermore, the processor 701 may be specifically configured to:

allocate sequence numbers to the transaction data, where a sequence number is allocated to transaction data of a same terminal; and for transaction data of any terminal, use a sequence number of the transaction data to perform a modulo operation on the quantity of cache lines of the circular queue, determine a cache line in the circular queue corresponding to the transaction data, and load the transaction data of the terminal into the corresponding cache line.

Furthermore, the processor 701 may be specifically configured to:

according to the quantity of terminals, establish multiple threads; and parallel-read the transaction data in the cache queue by the multiple threads.

Furthermore, the processor 701 may be specifically configured to:

acquire second clearing requests, where the second clearing requests are launched internally after a preset time is detected; and according to the second clearing requests, acquire transaction data, from a history time before the preset time to within the preset time, from the database.

The present disclosure is described with reference to flowcharts and/or block diagrams of methods, devices (systems), and computer program products according to various embodiments of the present disclosure. It should be understood that each process and/or block in the flowcharts and/or block diagrams, and the combination of processes and/or blocks in the flowcharts and/or block diagrams may be implemented by computer program instructions. Such computer program instructions may be provided to the processor of a general-purpose computer, a special-purpose computer, an embedded processor, or other programmable data processing apparatus, such that the instructions executed by the processor of the computer or other programmable data processing apparatus may implement the functions specified in one or more processes in the flowcharts and/or one or more blocks in the block diagrams.

Such computer program instructions may also be stored in a computer-readable memory that can direct a computer or other programmable data processing apparatus to work in a specific manner, such that the instructions stored in the computer-readable memory produce a manufacturing article including the instruction device. The instruction device implements the functions specified in one or more processes in the flowcharts and/or one or more blocks in the block diagrams.

Such computer program instructions may also be loaded on a computer or other programmable data processing apparatus, such that a series of operation steps are executed on the computer or other programmable apparatus to produce computer-implemented processing. Therefore, the instructions executed by the processor of the computer or other programmable data processing apparatus may implement the functions specified in one or more processes in the flowcharts and/or one or more blocks in the block diagrams.

Although the preferred embodiments of the present disclosure have been described, those skilled in the art may make additional changes and modifications to such embodiments once they learn the basic creative concept. Therefore, the appended claims may be intended to be interpreted as including the preferred embodiments and all changes and modifications falling within the scope of the present disclosure.

Obviously, those skilled in the art may make various changes and modifications to the present disclosure without departing from the spirit and scope of the present disclosure. In such way, if these modifications and variations of the present disclosure fall within the scope of the claims of the present disclosure and their equivalent technologies, the present disclosure may also be intended to include these modifications and variations.

What is claimed is:

1. A method for transaction clearing, comprising:
   receiving first clearing requests transmitted by a quantity N of terminals, wherein N>1;
   according to the first clearing requests, acquiring transaction data of the quantity N of terminals from a database;
   according to the quantity N of terminals, determining a quantity of cache lines of a cache queue and establishing multiple threads, wherein the cache queue is a circular queue, and the quantity of cache lines of the circular queue is 2 to a power of M, wherein $2^M > N$;
   initializing the cache queue, and loading the transaction data into the cache queue;
   parallel-reading the transaction data in the cache queue by the multiple threads, and performing a clearing process on the transaction data; and
   writing a clearing result into the database and feeding back the quantity N of terminals with an execution result of the first clearing requests.

2. The method according to claim 1, wherein loading the transaction data into the cache queue includes:
   allocating sequence numbers to the transaction data, wherein a sequence number is allocated to transaction data of a same terminal; and
   for transaction data of any one of the quantity N of terminals, using a sequence number of the transaction data of any one of the quantity N of terminals to perform a modulo operation on the quantity of cache lines of the circular queue, determining a cache line in the circular queue corresponding to the transaction data of any one of the quantity N of terminals, and loading the transaction data of the terminal into the corresponding cache line.

3. The method according to claim 1, prior to initializing the cache queue and loading the transaction data into the cache queue, further including:
   acquiring second clearing requests, wherein the second clearing requests are launched internally after a preset time is detected; and
   according to the second clearing requests, acquiring transaction data, from a history time before the preset time to within the preset time, from the database.

4. A device for transaction clearing, comprising:
   a memory, configured to store program instructions for performing a method for transaction clearing; and
   a processor, coupled with the memory and, when executing the program instructions, configured to:
   receive first clearing requests transmitted by a quantity N of terminals, wherein N>1;
   according to the first clearing requests, acquire transaction data of the quantity N of terminals from a database;
   according to the quantity N of terminals, determine a quantity of cache lines of a cache queue and establish multiple threads, wherein the cache queue is a circular queue, and the quantity of cache lines of the circular queue is 2 to a power of M, wherein $2^M > N$;
   initialize the cache queue and load the transaction data into the cache queue;
   parallel-read the transaction data in the cache queue by the multiple threads and perform a clearing process on the transaction data; and
   write a clearing result into the database and feed back the quantity N of terminals with an execution result of the first clearing requests.

5. The device according to claim 4, wherein the processor is further configured to:
   allocate sequence numbers to the transaction data, wherein a sequence number is allocated to transaction data of a same terminal; and
   for transaction data of any one of the quantity N of terminals, use a sequence number of the transaction data of any one of the quantity N of terminals to perform a modulo operation on the quantity of cache lines of the circular queue, determine a cache line in the circular queue corresponding to the transaction data of any one of the quantity N of terminals, and load the transaction data of the terminal into the corresponding cache line.

6. The device according to claim 4, wherein the processor is further configured to acquire second clearing requests, wherein the second clearing requests are launched internally after a preset time is detected; and
   the processor is further configured to, according to the second clearing requests, acquire transaction data, from a history time before the preset time to within the preset time, from the database.

7. A non-transitory computer-readable storage medium, containing program instructions that, when being executed by a processor, causing the processor to perform:
   receiving first clearing requests transmitted by a quantity N of terminals, wherein N>1;
   according to the first clearing requests, acquiring transaction data of the quantity N of terminals from a database;
   according to the quantity N of terminals, determining a quantity of cache lines of a cache queue and establishing multiple threads, wherein the cache queue is a circular queue, and the quantity of cache lines of the circular queue is 2 to a power of M, wherein $2^M > N$;
   initializing the cache queue, and loading the transaction data into the cache queue;
   parallel-reading the transaction data in the cache queue by the multiple threads, and performing a clearing process on the transaction data; and
   writing a clearing result into the database and feeding back the quantity N of terminals with an execution result of the first clearing requests.

8. The storage medium according to claim 7, wherein loading the transaction data into the cache queue includes:
   allocating sequence numbers to the transaction data, wherein a sequence number is allocated to transaction data of a same terminal; and
   for transaction data of any one of the quantity N of terminals, using a sequence number of the transaction data of any one of the quantity N of terminals to perform a modulo operation on the quantity of cache lines of the circular queue, determining a cache line in the circular queue corresponding to the transaction data of any one of the quantity N of terminals, and loading the transaction data of the terminal into the corresponding cache line.

9. The storage medium according to claim 7, prior to initializing the cache queue and loading the transaction data into the cache queue, further including:
  acquiring second clearing requests, wherein the second clearing requests are launched internally after a preset time is detected; and
  according to the second clearing requests, acquiring transaction data, from a history time before the preset time to within the preset time, from the database.

\* \* \* \* \*